(12) United States Patent
Tannenbaum et al.

(10) Patent No.: US 11,150,721 B2
(45) Date of Patent: Oct. 19, 2021

(54) PROVIDING HINTS TO AN EXECUTION UNIT TO PREPARE FOR PREDICTED SUBSEQUENT ARITHMETIC OPERATIONS

(71) Applicant: NVIDIA Corporation, Santa Clara, CA (US)

(72) Inventors: David Conrad Tannenbaum, Austin, TX (US); Ming Y. Siu, Santa Clara, CA (US); Stuart F Oberman, Sunnyvale, CA (US); Colin Sprinkle, Sunnyvale, CA (US); Srinivasan Iyer, Austin, TX (US); Ian Chi Yan Kwong, Santa Clara, CA (US)

(73) Assignee: NVIDIA Corporation, Santa Clara, CA (US)

( * ) Notice: Subject to any disclaimer, the term of this patent is extended or adjusted under 35 U.S.C. 154(b) by 561 days.

(21) Appl. No.: 13/671,485

(22) Filed: Nov. 7, 2012

(65) Prior Publication Data

US 2014/0129807 A1 May 8, 2014

(51) Int. Cl.
*G06F 1/3287* (2019.01)
*G06F 9/38* (2018.01)
*G06F 8/41* (2018.01)

(52) U.S. Cl.
CPC .............. *G06F 1/3287* (2013.01); *G06F 8/41* (2013.01); *G06F 9/3836* (2013.01)

(58) Field of Classification Search
CPC .................................................... G06F 1/3287
See application file for complete search history.

(56) References Cited

U.S. PATENT DOCUMENTS

| | | | | |
|---|---|---|---|---|
| 5,241,491 A * | 8/1993 | Carlstedt | | 708/231 |
| 6,023,757 A * | 2/2000 | Nishimoto | | G06F 9/30196 712/209 |
| 6,061,367 A * | 5/2000 | Siemers | | 370/535 |
| 6,757,807 B1 * | 6/2004 | Jacobson | | G06F 9/3012 712/23 |
| 7,107,471 B2 * | 9/2006 | Feierbach | | G06F 1/3203 712/220 |
| 7,533,242 B1 * | 5/2009 | Moll | | G06F 12/0862 711/213 |
| 7,584,346 B1 * | 9/2009 | Chaudhry | | G06F 9/3802 711/156 |
| 2005/0240733 A1 * | 10/2005 | Luick | | 711/137 |
| 2008/0005547 A1 * | 1/2008 | Papakipos | | G06F 9/5027 712/244 |
| 2009/0150657 A1 * | 6/2009 | Gschwind et al. | | 712/239 |
| 2010/0153830 A1 * | 6/2010 | Gopal | | G06F 7/4991 714/809 |
| 2011/0093658 A1 * | 4/2011 | Zuraski et al. | | 711/125 |
| 2011/0307689 A1 * | 12/2011 | Chung et al. | | 712/234 |
| 2012/0089823 A1 * | 4/2012 | Jin | | G06F 9/30058 712/239 |

* cited by examiner

*Primary Examiner* — Keith E Vicary
(74) *Attorney, Agent, or Firm* — Artegis Law Group, LLP

(57) ABSTRACT

A system and method are described for providing hints to a processing unit that subsequent operations are likely. Responsively, the processing unit takes steps to prepare for the likely subsequent operations. Where the hints are more likely than not to be correct, the processing unit operates more efficiently. For example, in an embodiment, the processing unit consumes less power. In another embodiment, subsequent operations are performed more quickly because the processing unit is prepared to efficiently handle the subsequent operations.

25 Claims, 5 Drawing Sheets

PROVIDING HINTS TO AN EXECUTION UNIT TO PREPARE FOR PREDICTED SUBSEQUENT ARITHMETIC OPERATIONS

BACKGROUND OF THE INVENTION

Field of the Invention

The present invention generally relates to computer processing and, more specifically, to an approach for efficient arithmetic operations.

Description of the Related Art

In a computer processor, such as a central processing unit (CPU) or a graphics processing unit (GPU), a large portion of the total power consumed is attributable to reading, transporting, and operating on numerical data. For example, in a GPU, a data stream may consist of various interspersed operations, such as floating-point operations followed by integer operations and video-flavored instructions. The various mix and particular sets of instructions seen by the GPU and their ordering can be highly dependent on the application being executed.

Whereas a low level processor and its components, such as arithmetic logic units (ALUs), may not be aware of patterns in the instructions to be executed by the GPU, at higher levels, there may be such information. For example, programmers of certain types of applications may be aware that the applications include mainly floating-point operations or, alternatively, integer operations. Still another program may implement many successive operations of the same variety (e.g., multiply-and-add).

Prior art processors, however, have not been adapted to take advantage of higher-level information such as may be available from a program being executed. In order to be able to execute any operation, an arithmetic unit may have to be reset after execution of one set of instructions before executing another set of instructions even if the next set of instructions may be known to a certain probability by other components of the system. Processors and their components, such as arithmetic units, are, therefore, configured to be prepared to execute any type of operation that they may see after such a reset. As a result, a processor and its components may execute a large number of operations from instruction-to-instruction, even if a next instruction may be known to be more likely than not. In this way traditional processors may execute unnecessary operations and consume substantial amounts of power unnecessarily.

As the foregoing illustrates, what is needed in the art is a technique for reducing the amount of power consumed by a processor by alleviating processing operations unnecessarily.

SUMMARY OF THE INVENTION

Disclosed are techniques for implementing a reduced-power processing unit. A system and method are described for providing hints to a processing unit that particular subsequent operations are likely. Responsively, the processing unit takes steps to prepare for the likely subsequent operations. Where the hints are more likely than not to be correct, the processing unit operates more efficiently. For example, in an embodiment, the processing unit consumes less power. In another embodiment, subsequent operations are performed more quickly because the processing unit is prepared to efficiently handle the subsequent operations.

In an embodiment of the invention, a processing unit receives an indication about the likelihood of subsequent information. In an embodiment, the unit is an ALU or execution unit but can be other units of a GPU or CPU in other embodiments. Where the unit is an ALU, for example, the likelihood indication (e.g., hint) can be an indication that certain types of instructions (e.g., integer operations) are more likely than not in subsequent instructions. In another embodiment, where the unit is an ALU, the likelihood indication can be an indication that certain types of instructions (e.g., integer operations) are more likely than a predetermined threshold for subsequent instructions (e.g., subsequent instructions are greater than 60% likely to be integer operations).

The processing unit is prepared responsive to the received likelihood indication. For example, in certain situations where the likelihood indication indicates that certain operations are likely (e.g., integer operations), the unit is prepared for such operations. In an embodiment, the unit may be pre-configured to execute such operations. In certain other situations, where the likelihood indication indicates that certain operations are not likely (e.g., do not expect floating-point operations), the unit is prepared not to perform such operations. In an embodiment, this can include powering down certain sections of the unit.

If a subsequently received instruction is consistent with the likelihood indication, the processing unit can efficiently execute the received instruction. For example, the received instruction may be implemented more quickly because certain setup steps have already been performed. Indeed, certain other steps may have been eliminated such that the received instruction can be executed more efficiently from a power perspective.

If the likelihood indication was incorrect, the unit would have been incorrectly preconfigured to execute the received instruction. Therefore, the processing unit (e.g., ALU) is prepared to execute the received instruction and the received instruction is executed.

In an embodiment, executing the received instruction leads to certain advantages including faster execution of the received instruction at reduced power. Incorrect hints (e.g., likelihood indications) may lead to increased computation time and power. Embodiments of the present invention nonetheless introduce advantages in execution time and power consumption in the aggregate if the likelihood indication is correct more often than not. In another embodiment, advantages can be realized where the likelihood indication is above a predetermined threshold.

These and other embodiments are described in further detail below.

BRIEF DESCRIPTION OF THE DRAWINGS

So that the manner in which the above recited features of the present invention can be understood in detail, a more particular description of the invention, briefly summarized above, may be had by reference to embodiments, some of which are illustrated in the appended drawings. It is to be noted, however, that the appended drawings illustrate only typical embodiments of this invention and are therefore not to be considered limiting of its scope, for the invention may admit to other equally effective embodiments.

DETAILED DESCRIPTION

In the following description, numerous specific details are set forth to provide a more thorough understanding of the present invention. It will, however, be apparent to one of skill in the art that the present invention may be practiced without one or more of these specific details. In other instances, well-known features have not been described in order to avoid obscuring the present invention.

System Overview

Figure 1:
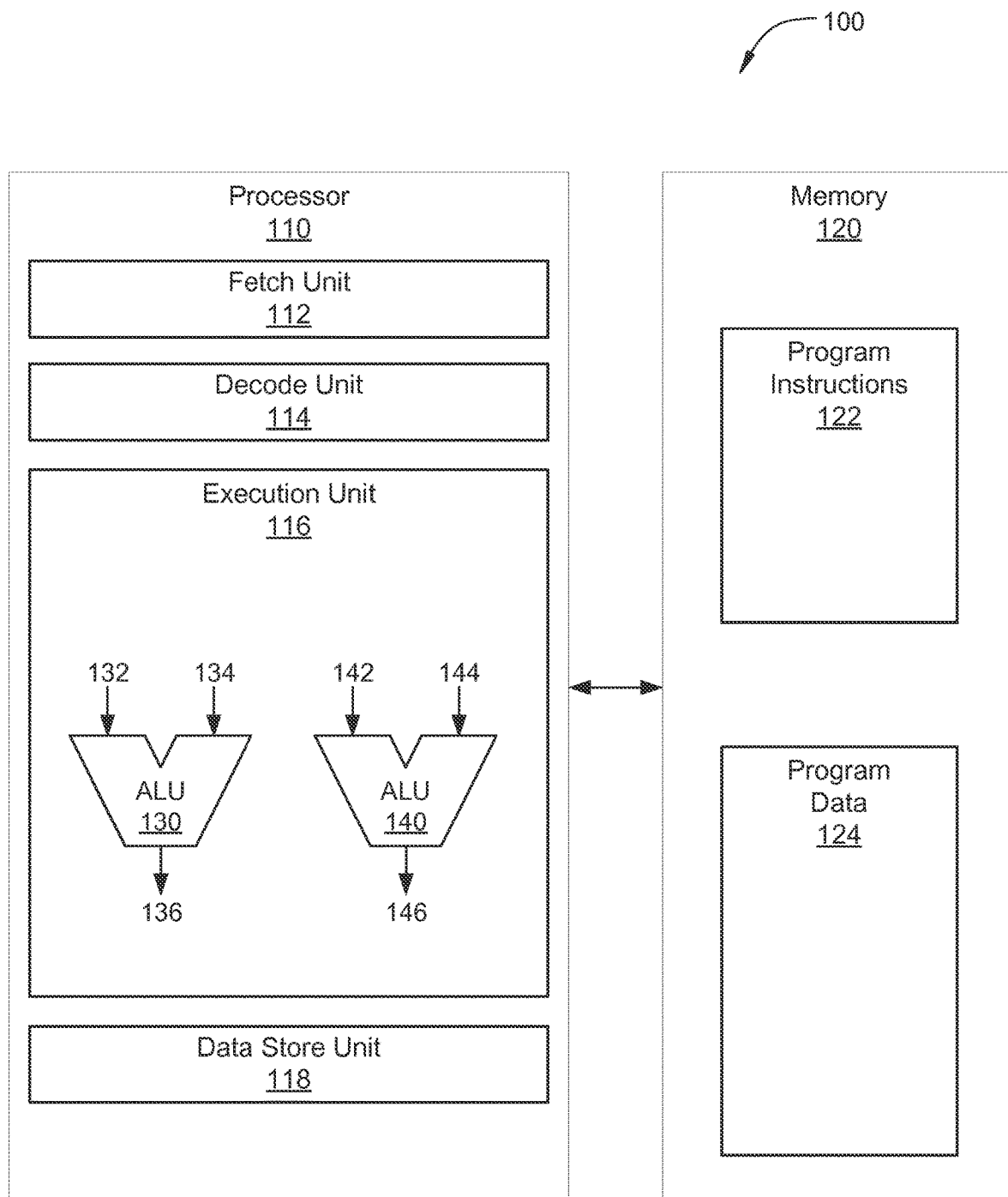
FIG. 1 is a conceptual diagram of a system in which one or more aspects of the invention may be implemented.

FIG. 1 is a block diagram of a system 100 in which one or more embodiments of the present invention may be implemented. As shown, system 100 includes processor 110, which may be any type of conventional CPU, GPU or similar processing device, coupled to memory 120. Processor 110, which may be any type of conventional CPU, GPU or similar processing device, includes fetch unit 112, decode unit 114, execution unit 116 and data store unit 118. Memory 120 stores information related to the operation of processor 110, including, without limitation, program instructions 122 and program data 124.

Fetch unit 112 retrieves a sequential instruction stream for processing from program instructions 122 stored in memory 120. Certain operations within the instruction stream require additional data, which may be retrieved by fetch unit 112 from program data 124 within memory 120. Decode unit 114 directs specific actions that should be performed by the logic within processor 110 in order to execute a decoded instruction. For example, decode unit 114 may configure execution unit 116 to perform an integer multiply upon decoding an integer multiply instruction from the instruction stream.

Execution unit 116 performs the operations associated with decoded instructions using dedicated hardware resources, including, without limitation, at least one arithmetic-logic unit (ALU). Conventional processors typically incorporate independent ALUs for processing related types of data. For example, execution unit 116 within processor 110 includes ALU 130 for processing integer operations and ALU 140 for processing floating-point operations. When the execution unit 116 performs an integer multiply, a multiplicand and a multiplier are presented to inputs 132 and 134 of ALU 130. The resulting product is emitted from output 136 of ALU 130 for further processing. Similarly, when the execution unit 116 performs a floating-point division, a dividend and divisor are presented to inputs 142 and 144 of ALU 140. ALU 140 computes a quotient, and emits the quotient via output 146.

Output 136 of ALU 130 and output 146 of ALU 140 may be stored within processor 110 or stored in program data 124. Data store unit 118 performs the necessary actions to store ALU outputs 130 and 140 in program data 124 within memory 120 for later use.

Figure 2:
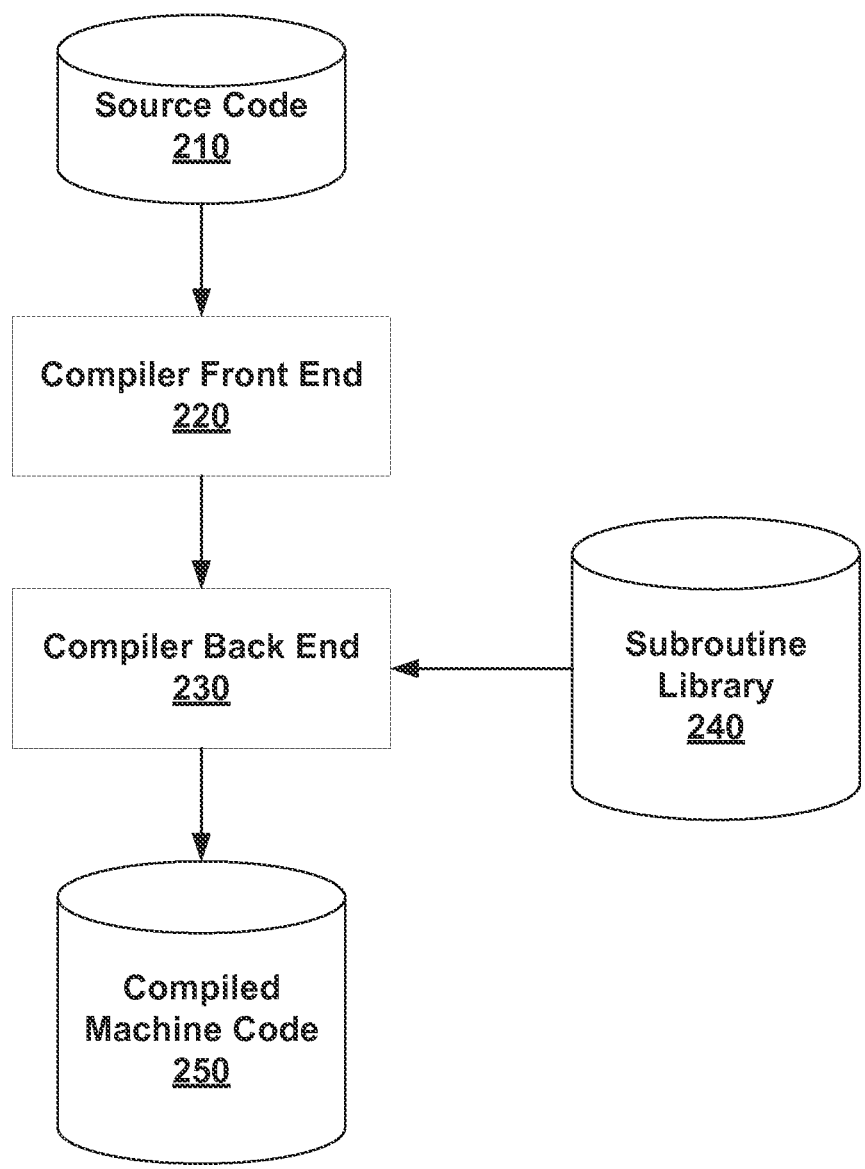
FIG. 2 is a conceptual illustration of source code to machine code compilation, according to one embodiment of the invention.

FIG. 2 is a block diagram of source code 210 to machine code 250 compilation, according to an embodiment of the present invention. As shown, source code 210, which may be written in a high-level language such as "C," is processed by compiler front-end 220. Compiler front-end 220 translates the source code 210 into an intermediate code representation of source code 210. The intermediate code represents the translated operations of source code 210 in terms of generic operations that tend to be independent of the specific instruction set of the target processor.

In fact, the intermediate code may invoke operations that are not directly supported by the target processor. For example, if source code 210 specifies an integer division operation in the flow of programming instructions, then that same division operation may be reproduced as an integer division operation in the more generic operations of the intermediate code. While integer division operations may be supported by some processors, these operations may not be supported by many conventional processors. For processors that do not directly support integer division, these operations may instead be implemented within subroutine library 240 and called or instantiated within compiled machine code 250.

Compiler back-end 230 receives the intermediate code and generates machine code that is specific to the target processor. In some embodiments, code from subroutine library 240 is incorporated into the compiled machine code 250 by compiler back-end 230. The functions within subroutine library 240 may then be invoked as needed with a function call. Alternately, selected functions within subroutine library 240 may be included in-line in compiled machine code 250, thereby eliminating the overhead of a function call but increasing the size of the resulting compiled machine code 250.

Compiled machine code 250 may be stored in memory 120 of FIG. 1 as all or part of program instructions 122. Compiled machine code 250, included in the program instructions 122, may be used by processor 110, for example, to perform integer division operations where the processor 110 does not include hardware elements dedicated for such operations.

Figure 3:
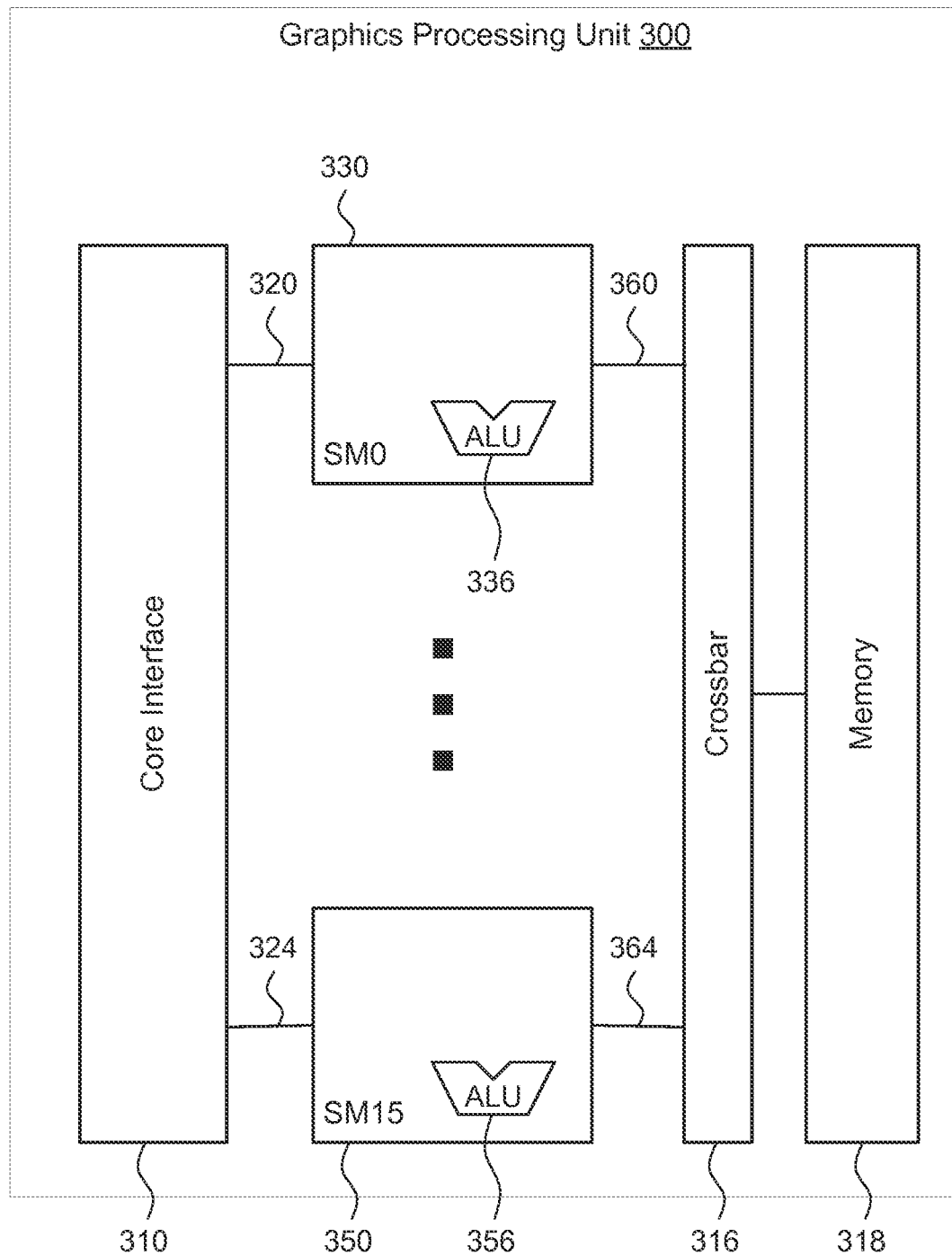
FIG. 3 is a conceptual diagram of a graphics processing unit in which one or more aspects of the invention may be implemented.

FIG. 3 is a conceptual diagram of a graphics processing unit (GPU) 300 in which one or more aspects of the invention may be implemented. As shown, the GPU 300 includes a memory 318 and a plurality of streaming multiprocessors, shown as "SM0" 330 and "SM15" 350. Each streaming multiprocessor is a single-instruction, multiple-data ("SIMD") multiprocessor that may execute instructions independently of the other streaming multiprocessors within the GPU 300. In addition, each streaming multiprocessor executes a single instruction on different data across a plurality of streaming processors (not shown) included within that streaming multiprocessor. The series of instructions to a single streaming processor within a streaming multiprocessor is referred to as a "thread," and the collection of concurrently executing threads among the streaming processors within the streaming multiprocessor is referred to as a "thread group."

The instructions executed by a streaming multiprocessor may be an arithmetic, logical and/or memory operation, including read and write operations to the memory 318. Arithmetic and logic operations are performed by ALUs 336 and 356. Each ALU 336, 356 includes logic to perform integer operations and floating-point operations, including, without limitation, integer addition and multiplication, as well as floating-point division. The threads executing on a particular streaming multiprocessor may be configured to execute the method steps of FIG. 5 in order to perform integer division with greater efficiency.

The GPU 300 also includes a core interface 310 that couples the GPU 300 to external memory resources. The core interface 310 is also coupled to the streaming multiprocessors 330 and 350 through a plurality of couplings, shown as interfaces 320 and 324, respectively. The streaming multiprocessors 330 and 350 are coupled to the memory 318 through a crossbar 316, which is advantageously designed to allow any streaming multiprocessor to access any memory location within the memory 318. The streaming multiprocessors 330 and 350 access the memory 318 through couplings 360 and 364, respectively, and through a coupling between the crossbar 316 and the memory 318. The couplings 360 and 364 may allow wide data transfers (e.g., 256 bits or more) between the memory 318 and the streaming multiprocessors of the GPU 300.

Figure 4:
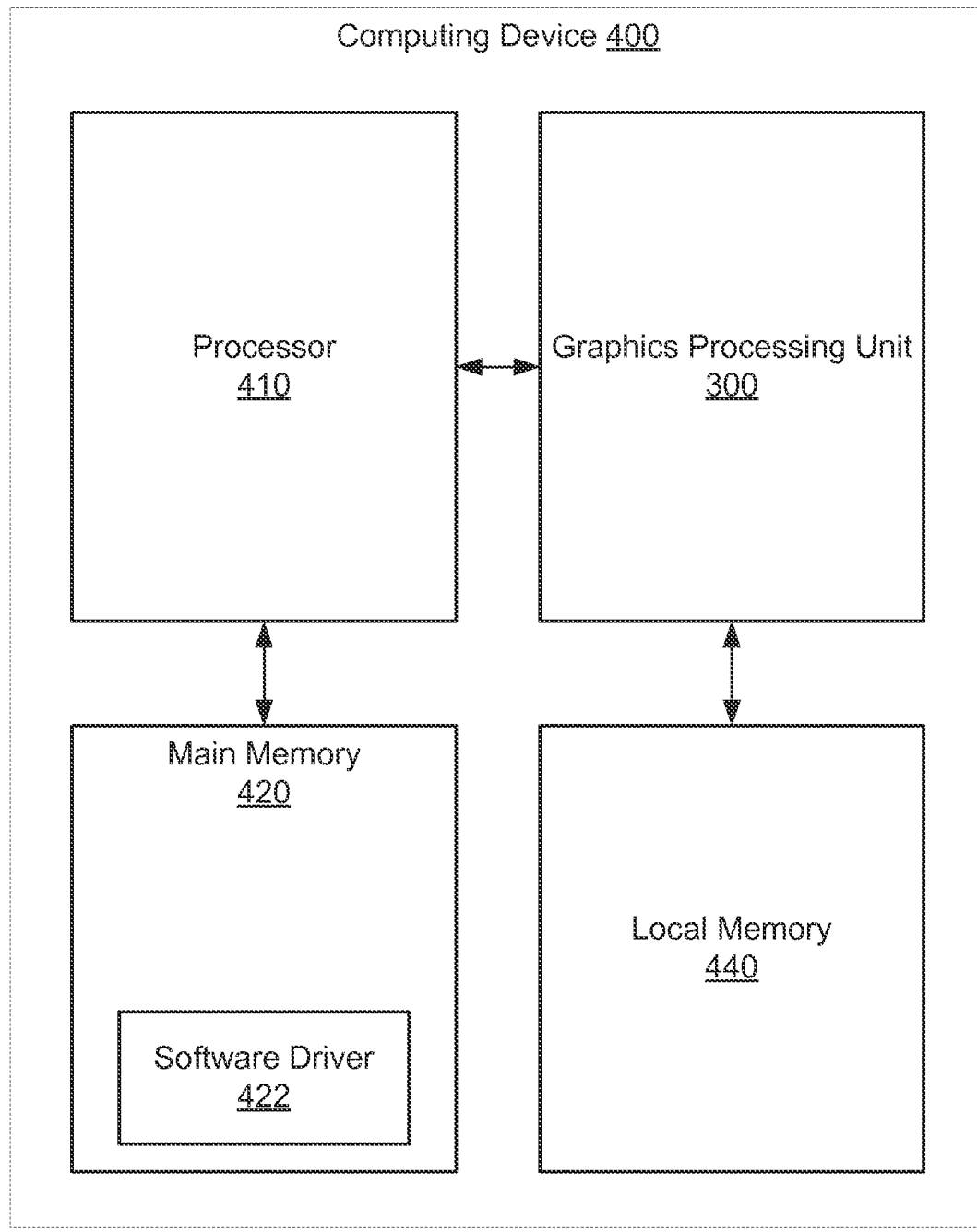
FIG. 4 is a conceptual diagram of a computing device that includes the graphics processing unit of FIG. 4 and is configured to implement one or more aspects of the invention.

FIG. 4 is a conceptual diagram of the computing device 400 that includes the graphics processing unit 300 of FIG. 3 and is configured to implement one or more aspects of the invention. As shown, the computing device 400 includes a processor 410, a main memory 420, a graphics processing unit 300 of FIG. 3 and a local memory 440. The main memory 420 includes a software driver program 422, used to configure and manage the graphics processing unit 300. The main memory 420 is coupled to the processor 410. The local memory 440 is coupled to the graphics processing unit 300, providing a high-bandwidth memory resource. In some embodiments, the main memory 420 may be accessed by the graphics processing unit 300 via the processor 410. In further embodiments, the local memory 440 may be accessed by the processor 410 via the graphics processing unit 300. In various embodiments, either the graphics processing unit 300 or the processor 410, or both, may be configured to implement the integer division algorithm described in conjunction with the method of FIG. 5. The computing device 400 may be a desktop computer, server, laptop computer, palm-sized computer, personal digital assistant, tablet computer, game console, cellular telephone, or any other type of similar device that processes information.

It should be noted that the descriptions of FIGS. 1-4 are intended to provide a general overview of systems on which embodiments of the present invention can be practiced. Accordingly, the figures and their associated description are not to be construed as limiting. Indeed, those of ordinary skill in the art will appreciate that embodiments of the present invention can be implemented in many other computing environments.

Efficient Processing Using Hints

An embodiment of the present invention implements an ALU (e.g., ALU 130, 140, 336, or 356) that makes use of hints about the likelihood of subsequent operations so as to reduce the power consumption of a GPU. Many times, at a relatively high-level, information may be available as to the types of operations that may be executed by an ALU. For example, a programmer may be aware that a particular type of program includes primarily floating-point operations or, conversely, integer operations. Still another program may implement a large proportion of fused multiply-add operations (e.g., fma or dfma (double precision fma)). Still other programs may execute many operations in particular orders (e.g., two floating-point operations, followed by ten integer operations). In many situations, this information may be available at the high level but is not passed on to lower level operations. For example, information regarding the types of arithmetic operations to be executed in a particular program (high-level) is not traditionally passed on to the arithmetic logic unit (low-level).

This lack of information pass-through has led to unnecessary power consumption in low levels of operation. For example, after execution of one instruction, an ALU has been required to be prepared to receive any kind of subsequent instruction. In being so prepared, an ALU must reset itself to be ready to receive any kind of operation. Resetting an ALU may require a number of circuit operations where such circuit operations consume power. In the aggregate, a processor (and its ALU, for example) may consume a large amount of power in resetting itself, despite the fact that a single type of instruction may be executed many times.

For example, where a particular type of program may execute millions or even billions of consecutive integer operations, traditional ALUs reset themselves after every operation, thereby wasting large amounts of power. Were the ALU to have information that subsequent operations may be of a particular variety, however, an ALU could take steps to avoid resetting itself, for example, and save a significant amount of power. If an ALU had information that it is likely to receive many consecutive integer operations, it need not reset itself and, instead just wait for a subsequent operation that is highly likely to be an integer operation.

Indeed, the information about subsequent operations need not be absolutely correct. For example, where information may be available that a particular kind of subsequent operation may be more likely than not, in the aggregate, a power savings can, nonetheless, be realized. Consider for example, that information is available that a subsequent operation can be 60% likely to be an integer operation. In such a situation, even where there is a 40% likelihood of being incorrect and that the ALU may have to reset itself after not getting an integer operation, in the aggregate, power savings can be realized. Indeed, power savings may be realized with information that a given operation may be only slightly more likely than not.

An embodiment of the present invention provides hints to the processor, ALU, datapath, or other components to allow it to more efficiently (e.g., from a power perspective) determine how to better execute certain instructions. For example, in an embodiment, an ALU may gate off portions of logic that are not expected to be needed in current and subsequent cycles. These hints need not be 100% accurate because they are used to suggest measures to be taken but not what is needed for perfect behavior. Even if the hints are incorrect, the units will take the necessary steps (e.g., reset) so as to execute the correct instructions.

Hints may include indications about the types of operations that may follow, e.g., only integer operations or only floating-point operations. Indeed, many other hints are possible. For example, for a given program, there may be no dfma instructions, only dadd (e.g., double precision add) and dmul (e.g., double precision multiply) instructions. With such information, certain blocks of circuitry may be powered down, while other circuitry may be prepared and kept in a prepared state so as to handle subsequent instructions. In another embodiment, internal logic switching may be reduced responsive to the hints. In still another embodiment of the present invention, flop toggling may be reduced. Many other techniques can be implemented responsive to the hints so as to save power responsive to the hints.

In other situations, a hint may include information regarding the information to be manipulated. For example, a hint may include information that only certain of the lowest order bits of a data field will change from operation-to-operation. With this type of information, associated circuitry can be managed to operate more efficiently. In still another embodiment, a hint may include an indication that double-precision arithmetic will be required. In general, any piece of information that provides reliable information about subsequent instructions can be used as a hint according to an embodiment of the present invention.

In an embodiment of the invention, hints can be derived at the time of writing a software program (e.g., source code 210). In yet another embodiment, hints can be derived from the machine code (e.g., compiled machine code 250). Still other information about the types of operations that are to be executed can be derived by the type of unit at issue, e.g., CPU versus GPU.

Figure 5:
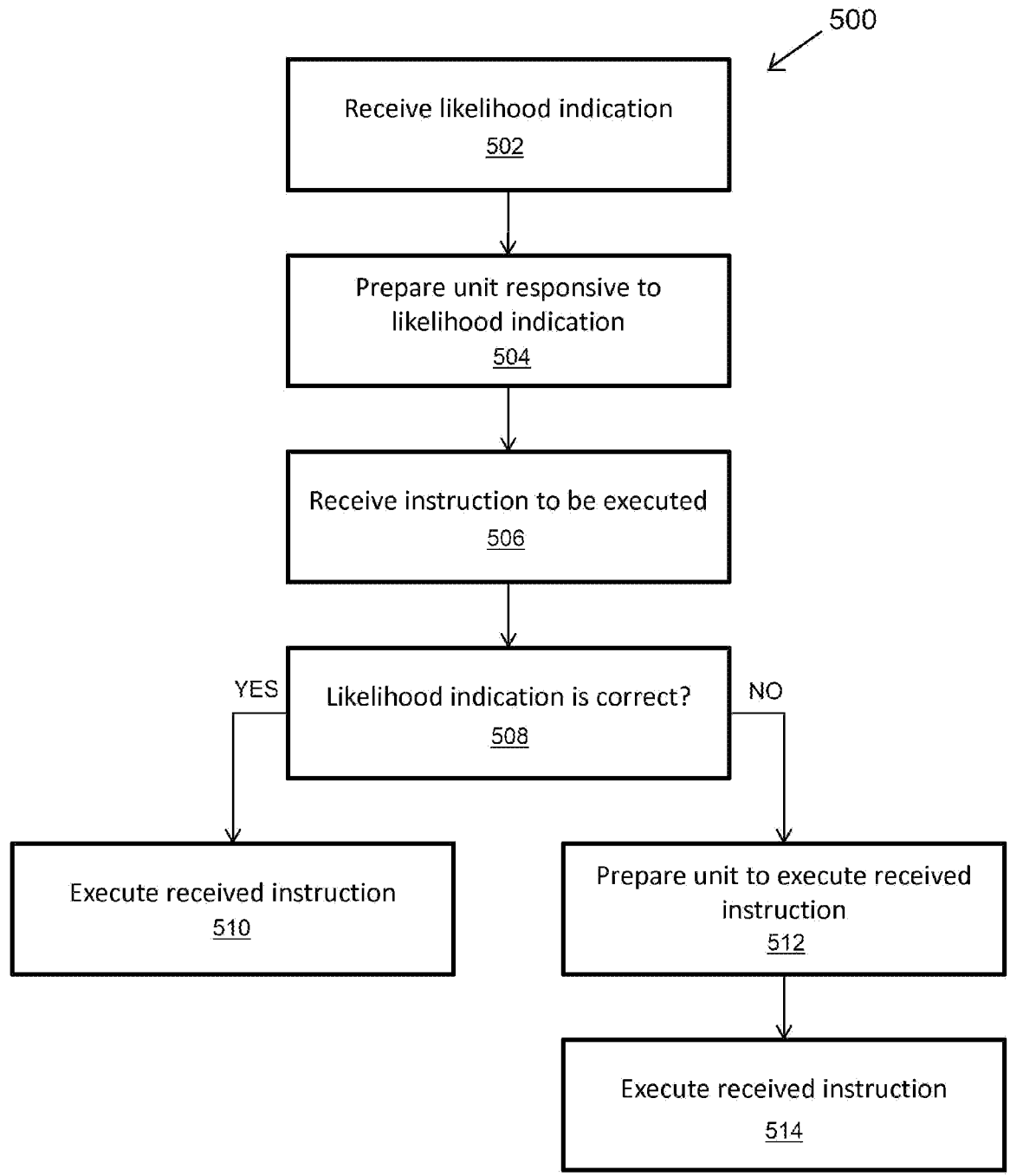
FIG. 5 is a flowchart of a method for taking advantage of hints in a processing unit according to an embodiment of the present invention.

In that regard, shown in FIG. 5 is a flow diagram of method steps for implementing a reduced power processing unit that makes use of instruction likelihood according to an embodiment of the present invention. It should be noted that the described embodiments are illustrative and do not limit the present invention. It should further be noted that the method steps need not be implemented in the order described. Indeed, certain of the described steps do not depend from each other and can be interchanged. For example, as persons skilled in the art will understand, any system configured to implement the method steps, in any order, falls within the scope of the present invention.

At step 502, a processing unit receives an indication about the likelihood of subsequent information. In an embodiment, the unit is an ALU (e.g., ALU 130, 140, 336, or 356) or execution unit 116 but can be other units of a GPU or CPU in other embodiments. In an embodiment where the unit is an ALU, for example, the likelihood indication can be an indication that certain types of instructions (e.g., integer operations) are more likely than not in subsequent instructions. In another embodiment, where the unit is an ALU, the likelihood indication can be an indication that certain types of instructions (e.g., integer operations) are more likely than a predetermined threshold for subsequent instructions (e.g., subsequent instructions are greater than 60% likely to be integer operations). Many other likelihood indications are possible as would be understood by those of ordinary skill in the art upon understanding the present disclosure.

At step 504, the unit is prepared responsive to the received likelihood indication. For example, in certain situations where the likelihood indication indicates that certain operations are likely (e.g., integer operations), the unit is prepared for such operations. In an embodiment, the unit may be pre-configured to execute such operations. In certain other situations, where the likelihood indication indicates that certain operations are not likely (e.g., do not expect floating-point operations), the unit is prepared not to perform such operations. In an embodiment, this can include powering down certain sections of the unit.

In an embodiment, likelihood indication is used internally, in the datapath, for example, to control gating values provided to certain logic branches. In an embodiment, the likelihood indication is used to suggest a relative likelihood of a particular scenario to allow for more power-efficient decisions to be made at the datapath modules. Many other steps could be taken by the unit responsive to the likelihood indication so as to prepare for subsequent expected operations as would be understood by those of ordinary skill in the art upon understanding the present disclosure.

At step 506, the actual step to be executed by the unit is received. Such received instruction can be as indicated by the likelihood indication at step 502 or inconsistent. In either case, method 500 will execute the correct instruction.

At step 508, a determination is made as to whether the likelihood indication is correct. If the likelihood indication was correct, the unit has been preconfigured to execute the instruction at step 510. Advantageously, step 510 may be implemented more quickly because certain setup steps have already been performed at step 504. Indeed, certain other steps may have been eliminated such that step 510 is performed more efficiently from a power perspective. For example, where many integer operations are correctly predicted by the likelihood indication, an ALU on which method 500 is implemented need not unnecessarily prepare itself to perform other operations, thereby potentially saving execution cycles and power.

At step 508, if the likelihood indication was incorrect, the unit has been incorrectly preconfigured to execute the received instruction. Therefore, at step 512, the unit (e.g., ALU) is prepared to execute the received instruction. In an embodiment, the ALU is reset at step 512 according to traditional implementations of ALUs. In another embodiment, the ALU is preconfigured at step 512 to directly execute the received instruction from step 506. At step 514, the received instruction is correctly executed.

In an embodiment, executing the received instruction at step 510 leads to certain advantages including faster execution of the received instruction at reduced power. Executing the received instruction at step 514, however, leads to slower execution of the received instruction at increased power. In an embodiment of the present invention, however, method 500 of FIG. 5 nonetheless introduces advantages in execution time and power consumption in the aggregate if the likelihood indication is correct more often than not. Yet in another embodiment, advantages can be realized where the likelihood indication is above a predetermined threshold.

One embodiment of the invention may be implemented as a program product for use with a computer system. The program(s) of the program product define functions of the embodiments (including the methods described herein) and can be contained on a variety of computer-readable storage media. Illustrative computer-readable storage media include, but are not limited to: (i) non-writable storage media (e.g., read-only memory devices within a computer such as CD-ROM disks readable by a CD-ROM drive, flash memory, ROM chips or any type of solid-state non-volatile semiconductor memory) on which information is permanently stored; and (ii) writable storage media (e.g., Flash media or hard-disk drive or any type of solid-state random-access semiconductor memory) on which alterable information is stored.

The invention has been described above with reference to specific embodiments. Persons skilled in the art, however, will understand that various modifications and changes may be made thereto without departing from the broader spirit and scope of the invention as set forth in the appended claims. The foregoing description and drawings are, accordingly, to be regarded in an illustrative rather than a restrictive sense.

The invention claimed is:

1. A method for executing instructions within a processor, the method comprising:
   receiving, by an execution unit included within the processor, a first hint specifying that a first type of instruction that includes a first type of arithmetic operation is predicted to be subsequently received by the execution unit;
   in response to receiving the first hint and before receiving a first instruction, preparing the execution unit to execute the first type of instruction that includes the first type of arithmetic operation based on the first type of arithmetic operation specified in the first hint;

receiving, by the execution unit, the first instruction, wherein the first instruction is to be executed by the execution unit;

determining whether the first instruction includes the first type of arithmetic operation; and either executing, by the execution unit, the first instruction when the first instruction includes the first type of arithmetic operation, or preparing the execution unit to execute the first instruction when the first instruction does not include the first type of arithmetic operation.

2. The method of claim 1, further comprising executing the first instruction when the first instruction does not include the first type of arithmetic operation.

3. The method of claim 1, wherein the processor is a central processing unit.

4. The method of claim 1, wherein the processor is a graphics processing unit.

5. The method of claim 1, wherein the execution unit is an arithmetic logic unit.

6. The method of claim 1, wherein the first hint further specifies that the first type of instruction is more likely to be subsequently received than not.

7. The method of claim 1, wherein the first hint further specifies that a probability of subsequently receiving the first type of instruction exceeds a predetermined threshold.

8. The method of claim 1, wherein the first hint is generated responsive to a source code version of a set of instructions.

9. The method of claim 1, wherein the first hint is generated responsive to a machine code version of a set of instructions.

10. The method of claim 1, wherein the execution unit is coupled to an arithmetic logic unit datapath.

11. The method of claim 1, wherein preparing the execution unit to execute the first type of instruction that includes the first type of arithmetic operation based on the first type of arithmetic operation specified in the first hint comprises powering down circuitry not associated with the first type of arithmetic operation.

12. The method of claim 1, wherein a second hint specifies that only a first subset of lower ordered bits of a data field changes from operation to operation.

13. The method of claim 1, wherein the first hint further specifies that the first type of arithmetic operation is a double precision arithmetic operation, an integer operation, or a floating-point operation.

14. The method of claim 1, wherein a second hint specifies that only a first subset of bits within a data field is changed by the first type of instruction.

15. The method of claim 1, wherein the first hint further specifies that the first type of arithmetic operation comprises an operation other than a second type of arithmetic operation.

16. A processing system, comprising:
a processor; and
an execution unit included within the processor and configured to:
receive a first hint specifying that a first type of instruction that includes a first type of arithmetic operation is predicted to be subsequently received by the execution unit;
in response to receiving the first hint and before receiving a first instruction, prepare the execution unit to execute the first type of instruction that includes the first type of arithmetic operation based on the first type of arithmetic operation specified in the first hint;
receive the first instruction, wherein the first instruction is to be executed by the execution unit;
determine whether the first instruction includes the first type of arithmetic operation; and
either execute the first instruction when the first instruction includes the first type of arithmetic operation, or prepare the execution unit to execute the first instruction when the first instruction does not include the first type of arithmetic operation.

17. The processing system of claim 16, wherein the execution unit is further configured to execute the first instruction when the first instruction does not include the first type of arithmetic operation.

18. The processing system of claim 16, wherein the processor is a central processor.

19. The processing system of claim 16, wherein the processor is a graphics processor.

20. The processing system of claim 16, wherein the execution unit is an arithmetic logic processor.

21. The processing system of claim 16, wherein the first hint further specifies that the first type of instruction is more likely to be subsequently received than not.

22. The processing system of claim 16, wherein the first hint further specifies that a probability of subsequently receiving the first type of instruction exceeds a predetermined threshold.

23. The processing system of claim 16, wherein the first hint is generated responsive to a source code version of a set of instructions.

24. The processing system of claim 16, wherein the first hint is generated responsive to a machine code version of a set of instructions.

25. A computing device comprising:
a data bus;
a processor coupled to the data bus;
an execution unit included within the processor and configured to:
receive a first hint specifying that a first type of instruction that includes a first type of arithmetic operation is predicted to be subsequently received by the execution unit;
in response to receiving the first hint and before receiving a first instruction, prepare the execution unit to execute the first type of instruction that includes the first type of arithmetic operation based on the first type of arithmetic operation specified in the first hint;
receive the first instruction, wherein the first instruction is to be executed by the execution unit; and
cause the execution unit to execute the first instruction when the first instruction includes the first type of arithmetic operation.

* * * * *